(12) United States Patent
Wu et al.

(10) Patent No.: US 8,283,398 B2
(45) Date of Patent: Oct. 9, 2012

(54) POLYHEDRAL SILSESQUIOXANE MODIFIED POLYIMIDE CONTAINING INTERMEDIATE TRANSFER MEMBERS

(75) Inventors: Jin Wu, Webster, NY (US); Brian P Gilmartin, Williamsville, NY (US); Lanhui Zhang, Webster, NY (US); Lin Ma, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 459 days.

(21) Appl. No.: 12/511,183

(22) Filed: Jul. 29, 2009

(65) Prior Publication Data
US 2011/0027598 A1 Feb. 3, 2011

(51) Int. Cl.
C08K 3/18 (2006.01)

(52) U.S. Cl. ...... 524/430; 428/474.4; 428/339; 524/588; 252/500; 252/511

(58) Field of Classification Search ............ 524/430
See application file for complete search history.

(56) References Cited

U.S. PATENT DOCUMENTS

| | | | |
|---|---|---|---|
| 6,397,034 B1 | 5/2002 | Tarnawskyj et al. | |
| 6,602,156 B2 | 8/2003 | Schlueter, Jr. | |
| 6,820,738 B2 * | 11/2004 | Hara et al. | 198/844.2 |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 7,280,791 B2 | 10/2007 | Goodman et al. | |
| 8,012,583 B2 | 9/2011 | Wu | |
| 2005/0154150 A1 * | 7/2005 | Wei et al. | 525/474 |
| 2007/0026226 A1 | 2/2007 | Chen et al. | |
| 2007/0027284 A1 | 2/2007 | Wei et al. | |
| 2009/0069508 A1 | 3/2009 | Poe et al. | |
| 2011/0027709 A1 | 2/2011 | Wu et al. | |

FOREIGN PATENT DOCUMENTS

| | | |
|---|---|---|
| JP | A-11-219036 | 8/1999 |
| JP | A-2006-243146 | 9/2006 |

OTHER PUBLICATIONS

Wahab et al, Journal of Polymer Science: Part A: Polymer Chemistry, vol. 46, 5887-5896.*
Jin Wu, U.S. Application No. entitled Polyaniline Silanol Containing Intermediate Transfer Members, filed concurrently herewith.
Jin Wu et al, U.S. Application No. entitled Polyhedral Silsesquioxane Modified Polyimide Containing Intermediate Transfer Members, filed concurrently herewith.
Jin Wu, U.S. Appl. No. 12/181,354 entitled Core Shell Intermediate Transfer Components, filed Jul. 29, 2008.
Jin Wu et al, U.S. Appl. No. 12/431,829 entitled Core Shell Hydrophobic Intermediate Transfer Components, filed Apr. 29, 2009.
Jin Wu, U.S. Appl. No. 12/181,409 entitled Treated Carbon Black Intermediate Transfer Components, filed Jul. 29, 2008.
May 13, 2011 European Search Report issued in EP 10 17 0937.

* cited by examiner

Primary Examiner — Doris Lee
(74) Attorney, Agent, or Firm — Eugene O. Palazzo

(57) ABSTRACT

An intermediate transfer media that includes a single layer of a polyhedral silsesquioxane polyimide, and where the silsesquioxane is attached to the polyimide or a multi layer transfer media that includes a supporting substrate, such as a polyimide, and thereover a polyhedral silsesquioxane modified polyimide, and where the silsesquioxane is attached to the polyimide.

33 Claims, No Drawings

POLYHEDRAL SILSESQUIOXANE MODIFIED POLYIMIDE CONTAINING INTERMEDIATE TRANSFER MEMBERS

CROSS REFERENCE TO RELATED APPLICATIONS

Illustrated in U.S. application Ser. No. 12/511,160, U.S. Publication No. 20110027709, on Fluoroelastomer Containing Intermediate Transfer Members, filed concurrently herewith, the disclosure of which is totally incorporated herein by reference, is an intermediate transfer member comprised of a core shell component dispersed in a fluoroelastomer, and wherein the core is comprised of a metal oxide and the shell is comprised of silica.

Illustrated in U.S. application Ser. No. 12/511,169, now U.S. Pat. No. 8,012,583 on Polyaniline Silanol Containing Intermediate Transfer Members, filed concurrently herewith, the disclosure of which is totally incorporated herein by reference, is an intermediate transfer belt comprised of a core shell component, and wherein the core is comprised of a polyaniline, and the shell is comprised of polyhedral silsesquioxane.

Illustrated in U.S. application Ser. No. 12/181,409, now U.S. Pat. No. 7,738,824 on Treated Carbon Black Intermediate Transfer Components, filed Jul. 29, 2008, the disclosure of which is totally incorporated herein by reference, is an intermediate transfer members comprised of a substrate comprising a poly(vinylalkoxysilane) surface treated carbon black.

Illustrated in U.S. application Ser. No. 12/181,354, now U.S. Pat. No. 7,985,464 on Core Shell Intermediate Transfer Components, filed Jul. 29, 2008, the disclosure of which is totally incorporated herein by reference, is an intermediate transfer belt comprised of a substrate comprising a conductive core shell component.

Illustrated in U.S. application Ser. No. 12/431,829, U.S. Publication No. 20100279094 on Core Shell Hydrophobic Intermediate Transfer Components, filed Apr. 29, 2009, the disclosure of which is totally incorporated herein by reference, an intermediate transfer belt comprised of a substrate comprising a core shell component and wherein the core is comprised of a metal oxide and the shell is comprised of silica.

BACKGROUND

Disclosed are intermediate transfer members, and more specifically, intermediate transfer members useful in transferring a developed image in an electrostatographic, for example xerographic, including digital, image on image, and the like, printers, machines or apparatuses. In embodiments, there are selected intermediate transfer members comprised of a single layer, or multi layers, such as a dual layer intermediate transfer member comprised of, for example, a polyimide bottom or support layer, and a POSS modified polyimide surface layer, and wherein each layer of the member further comprises a conductive component. The POSS modified polyimide can, for example, be generated in situ by mixing a functional POSS, such as POSS amines, POSS alcohols, POSS carboxylic acids, or POSS epoxides, with a polyamic acid solution (polyimide precursor) followed by the subsequent coating on a support layer followed by curing. In embodiments, the POSS amines, POSS alcohols, POSS carboxylic acids, or POSS epoxides react with the carboxylic acid or amine group of the polyamic acid (polyimide precursor) during the imidization, thus chemically bonding or chemically attached to the resulting polyimide.

The single layered member is comprised of a POSS modified polyimide generated, for example, by the in situ mixing of a functional POSS, such as POSS amines, POSS alcohols, POSS carboxylic acids, or POSS epoxides with a polyamic acid solution (polyimide precursor) followed by subsequent coating of the product resulting from the mixture on a metal substrate and curing, and then releasing the coating from the substrate.

POSS refers, for example, to a polyhedral silsesquioxane, and more specifically, to a oligomeric polyhedral silsesquioxane or a polyhedral oligomeric silsesquioxane (POSS), like POSS $RSiO_{1.5}$, where R is an alkyl with, for example, from about 1 to about 18 carbon atoms, or from about 4 to about 8 carbon atoms; aryl with, for example, from about 6 to about 42 carbon atoms, or from about 6 to about 24 carbon atoms.

The intermediate transfer members of the present disclosure, in embodiments thereof, possess a number of advantages, such as an acceptable functional resistivity, excellent layer/layer adhesion for the multilayered members, a hydrophobic surface layer, excellent surface tension characteristics (high contact angle), hydrophobic characteristics, excellent dimensional stability, excellent image transfer properties, and acceptable mechanical properties such as scratch resistance.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant, which are commonly referred to as toner. Generally, the electrostatic latent image is developed by bringing a developer mixture into contact therewith. The developer mixture can comprise a dry developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently transfer with a high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential difference between the imaging member and the intermediate transfer member, the transfer of the toner particles to the intermediate transfer member, and the retention thereof should be substantially complete so that the image ultimately transferred to the image receiving substrate will have a high resolution. Substantially 100 percent toner transfer occurs when most or all of the toner particles comprising the image are transferred, and little residual toner remains on the surface from which the image was transferred.

A disadvantage of using an intermediate transfer member is that a plurality of transfer steps is usually needed allowing for the possibility of charge exchange occurring between toner particles and the transfer member which ultimately can lead to less than complete toner transfer. This results in low resolution images on the image receiving substrate and also image deterioration. When the image is in color, the image can additionally suffer from color shifting and color deterioration with a number of transfer stops.

In embodiments, the resistivity of the intermediate transfer member is within a range to allow for sufficient transfer. It is also desired that the intermediate transfer member have a controlled resistivity, wherein the resistivity is virtually unaffected by changes in humidity, temperature, bias field, and operating time. In addition, a controlled resistivity is of value so that a bias field can be established for electrostatic transfer. Also, it is of value that the intermediate transfer member not be too conductive as air breakdown can possibly occur.

In U.S. Pat. No. 6,397,034 there is disclosed the use of a fluorinated carbon filler in a polyimide intermediate transfer member layer. However, there are disadvantages associated with these members, such as undissolved particles that frequently bloom or migrate to the surface of the polymer layer which leads to nonuniform resistivity characteristics, which in turn causes poor antistatic properties and poor mechanical strength. Also, the ionic additives present on the surface of the transfer member, such as in the form of a belt may interfere with toner release, and bubbles may appear in the conductive polymer layer, some of which can only be seen with the aid of a microscope, others of which are large enough to be observed with the naked eye, resulting in poor or nonuniform electrical properties and poor mechanical properties.

In addition, the ionic additives themselves are sensitive to changes in temperature, humidity, and operating time. These sensitivities often limit the resistivity range of the transfer member. For example, the resistivity usually decreases by up to two orders of magnitude or more as the humidity increases from about 20 to 80 percent relative humidity. This effect limits the operational or process latitude of the intermediate transfer member.

Therefore, it is desired to provide intermediate transfer members with a number of the advantages illustrated herein and weldable intermediate transfer belts, which have excellent transfer ability. It is also desired to provide a weldable intermediate transfer belt that may not have puzzle cut seams, but instead has a weldable seam, thereby providing a belt that can be manufactured without such labor intensive steps as manually piecing together the puzzle cut seam with one's fingers, and without the lengthy high temperature and high humidity conditioning steps. In addition, it is also desired to provide an acceptable circumference weldable belt for color xerographic machines, inclusive of solid ink printers.

REFERENCES

Illustrated in U.S. Pat. No. 7,130,569 is a weldable intermediate transfer belt comprising a substrate comprising a homogeneous composition comprising a polyaniline in an amount of from about 2 to about 25 percent by weight of total solids, and a thermoplastic polyimide present in an amount of from about 75 to about 98 percent by weight of total solids, wherein the polyaniline has a particle size of from about 0.5 to about 5 microns.

Also referenced are U.S. Pat. No. 7,031,647, which illustrates an intermediate transfer belt, comprising a belt substrate comprising primarily at least one polyimide polymer; and a welded seam; and U.S. Pat. No. 7,139,519, which illustrates an image forming apparatus for forming images on a recording medium comprising a charge-retentive surface to receive an electrostatic latent image thereon;

a development component to apply toner to the charge-retentive surface to develop the electrostatic latent image to form a developed toner image on the charge retentive surface;

an intermediate transfer member to transfer the developed toner image from the charge retentive surface to a copy substrate, wherein the intermediate transfer member comprises a substrate comprising a first binder and lignin sulfonic acid doped polyaniline dispersion; and a fixing component to fuse the developed toner image to the copy substrate.

Also referenced is U.S. Pat. No. 7,280,791, which illustrates a weldable intermediate transfer belt comprising a substrate comprising a homogeneous composition comprising polyaniline in an amount of from about 2 to about 25 percent by weight of total solids, and thermoplastic polyimide in an amount of from about 75 to about 98 percent by weight of total solids, wherein the polyaniline has a particle size of from about 0.5 to about 5.0 microns.

The use of a polyaniline filler in a polyimide has been disclosed in U.S. Pat. No. 6,602,156. This patent discloses, for example, a polyaniline filled polyimide puzzle cut seamed belt. The manufacture of a puzzle cut seamed belt is labor intensive and costly, and the puzzle cut seam, in embodiments, is sometimes weak. The manufacturing process for a puzzle cut seamed belt usually requires a lengthy high temperature and a high humidity conditioning step.

EMBODIMENTS

In aspects thereof there is disclosed here an intermediate transfer member comprised of a polyhedral silsesquioxane modified polyimide, and wherein the silsesquioxane is attached to the polyimide; a transfer media comprised of a polyhedral silsesquioxane polyimide, and wherein the silsesquioxane is chemically bonded to the polyimide, and wherein the polyhedral silsesquioxane polyimide is formed or generated by the reaction of the silsesquioxane with a component as represented by at least one of

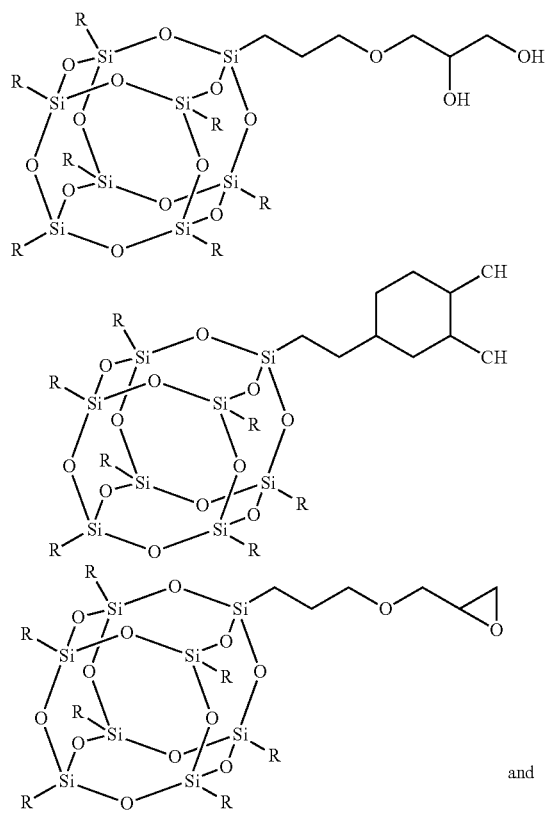

and

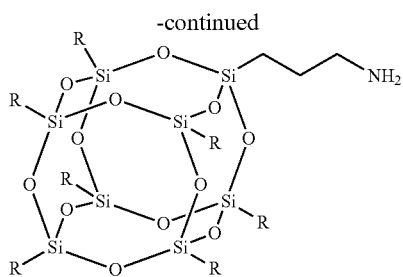

wherein each R is alkyl, aryl, or mixtures thereof; and an intermediate transfer media comprised of a supporting substrate, and thereover a polyhedral silsesquioxane polyimide, and wherein the silsesquioxane is chemically bonded to the polyimide, and wherein the polyhedral silsesquioxane is obtained by reacting the polyhedral silsesquioxane with a component as represented by

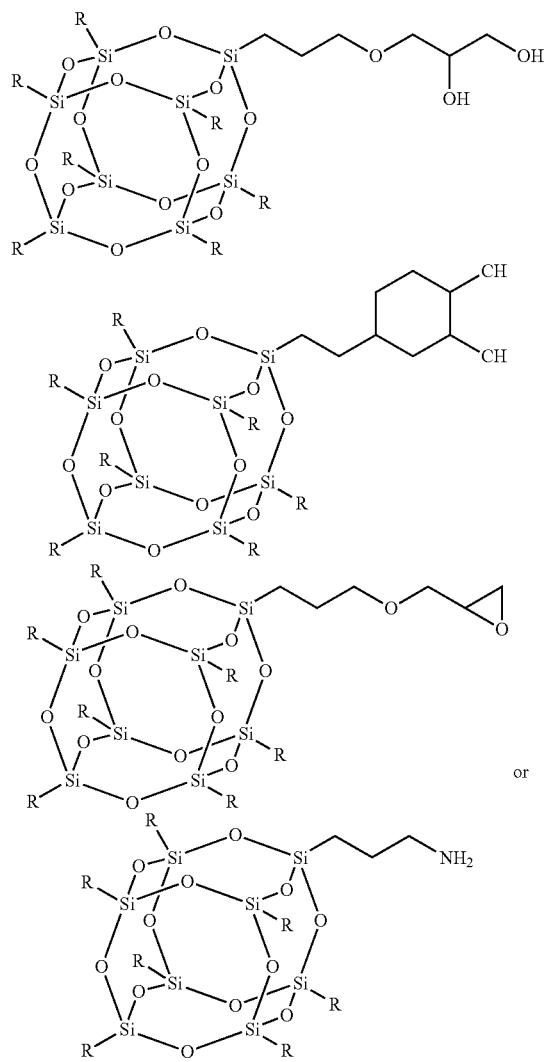

wherein each R is alkyl, aryl, or mixtures thereof.

In embodiments, the POSS alcohol comprises one POSS moiety, and at least one alcohol group, where at least one is from about 1 to about 8, from about 1 to about 4, from 1 to 4, and from 1 to 2. Typical POSS alcohols can be represented by

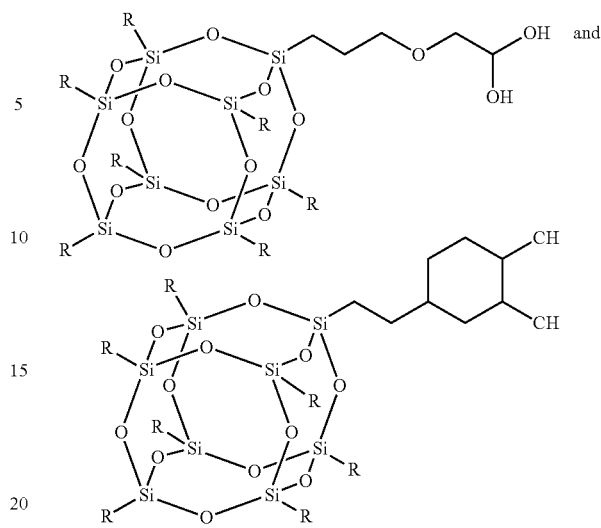

and, more specifically,

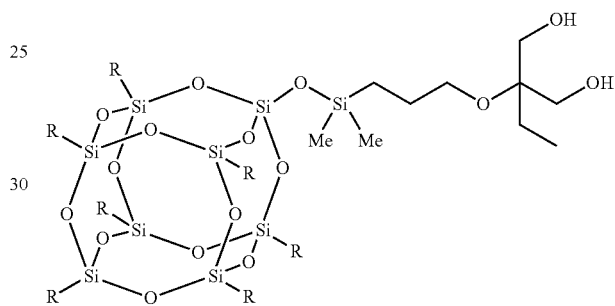

wherein R is a suitable hydrocarbon such as alkyl and aryl. Examples of alkyl contain from about 1 to about 18 carbon atoms, from about 2 to about 12 carbon atoms, and from 4 to about 6 carbon atoms, such as methyl, ethyl, propyl, butyl, isobutyl, pentyl, hexyl, cyclohexyl, and the like, and various isomers thereof. Aryl examples contain, for example, from about 6 to about 36 carbon atoms, from about 6 to about 24 carbon atoms, and from about 6 to about 18 or about 12 carbon atoms, such as phenyl, and the like.

Specific POSS alcohol examples include TMP 2-ethyl-2-[3-[[(heptaisobutylpentacyclo-[9.5.1.1$^{3,9}$.1$^{5,15}$.1$^{7,13}$]octasiloxanyl)oxy]dimethylsilyl]-propoxymethyl]-1,3-propanediol diolisobutyl POSS, trans-cyclohexanediolisobutyl POSS, 1,2-propanediolisobutyl POSS (AL0125), octa(3-hydroxy-3-methylbutyldimethylsiloxy) POSS (AL0130), all available from Hybrid Plastics Inc., Hattiesburg, Miss.

Examples of POSS epoxides comprise one POSS moiety, and at least one epoxide group, where at least one is from about 1 to about 8, from 1 to about 4, from 1 to 4, from 1 to 3, and from 1 to 2. Typical POSS epoxides can be represented by

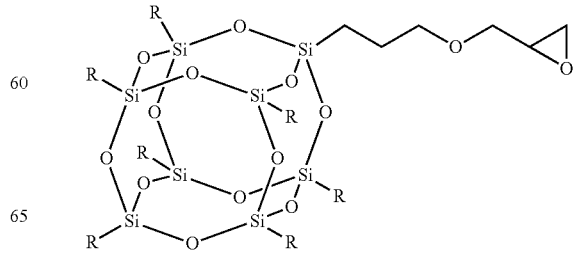

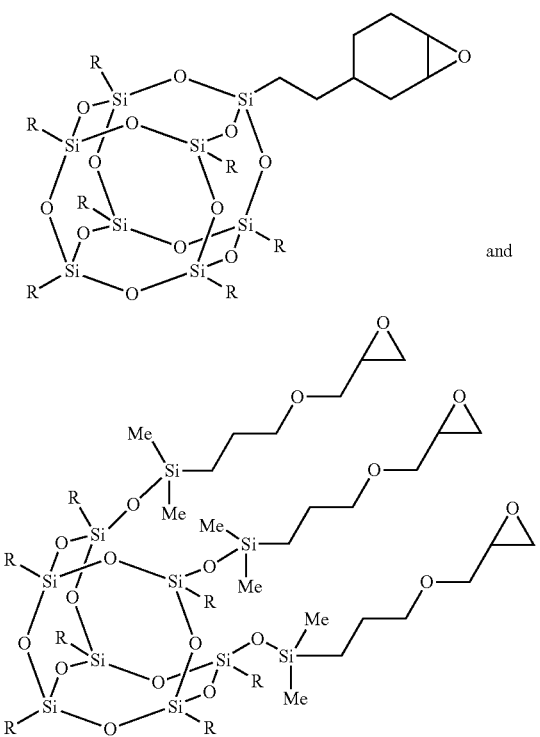

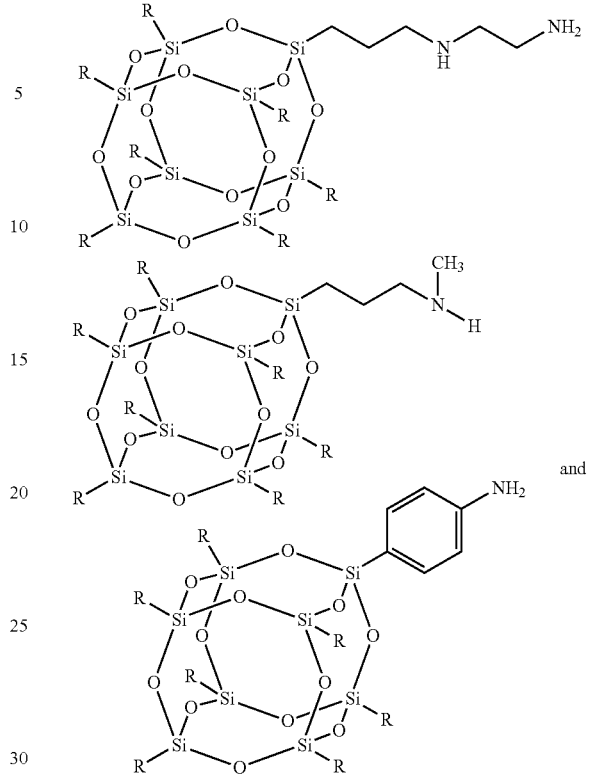

wherein R is a suitable hydrocarbon such as alkyl and aryl. Examples of alkyl contain from about 1 to about 18 carbon atoms, from 2 to about 12 carbon atoms, and from 4 to about 6 carbon atoms, such as methyl, ethyl, propyl, butyl, isobutyl, pentyl, hexyl, cyclohexyl, and the like, and various isomers thereof. Aryl examples contain, for example, from about 6 to about 24 carbon atoms, from about 6 to about 18 carbon atoms, from about 6 to about 12 carbon atoms, such as phenyl, and the like.

Specific POSS epoxide examples include epoxycyclohexylisobutyl POSS, glycidylethyl POSS, glycidylisobutyl POSS (EP0418), glycidylisooctyl POSS, triglycidylcyclohexyl POSS, triglycidylisobutyl POSS, glycidylphenyl POSS (EP0425), octaepoxycyclohexyldimethylsilyl POSS, octaglycidyldimethylsilyl POSS, all available from Hybrid Plastics Inc., Hattiesburg, Miss.

In embodiments, the POSS amine comprises one POSS moiety, and at least one amine group, where at least one is from about 1 to about 8, from 1 to about 4, from 1 to 2. Typical POSS amines can be represented by

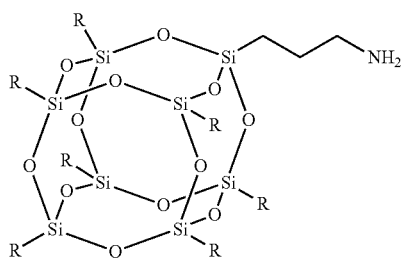

wherein R is a suitable hydrocarbon such as alkyl and aryl. Examples of alkyl contain from about 1 to about 18 carbon atoms, from 2 to about 12 carbon atoms, from 4 to about 6 carbon atoms, such as methyl, ethyl, propyl, butyl, isobutyl, pentyl, hexyl, cyclohexyl, and the like, and various isomers thereof. Aryl examples contain, for example, from about 6 to about 24 carbon atoms, from about 6 to about 18 carbon atoms, from about 6 to about 12 carbon atoms, such as phenyl, and the like.

Specific POSS amine examples include aminopropylisobutyl POSS, aminopropylisooctyl POSS, aminopropylphenyl POSS, aminoethylamino propylisobutyl POSS (AM0275), octaaminophenyl POSS, N-phenylaminopropyl POSS, N-methylaminopropylisobutyl POSS, octaammonium POSS, p-aminophenyl cyclohexyl POSS, m-aminophenylcyclohexyl POSS, p-aminophenylisobutyl POSS, m-aminophenylisobutyl POSS, all available from Hybrid Plastics Inc., Hattiesburg, Miss.

Examples of POSS carboxylic acids comprise one POSS moiety, and at least one carboxylic acid group, where at least one is from about 1 to about 8. Typical POSS carboxylic acids can be represented by

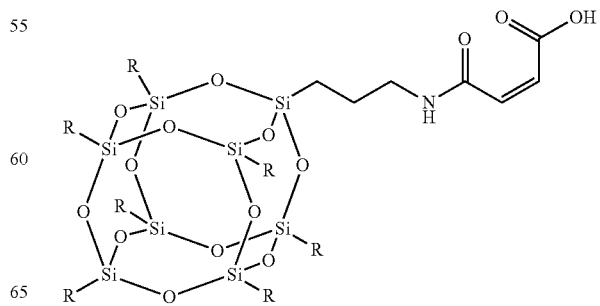

wherein R is a suitable hydrocarbon such as alkyl and aryl, and where throughout alkyl and aryl include substituted derivatives thereof. Examples of alkyl contain from about 1 to about 18 carbon atoms, from 2 to about 12 carbon atoms, from 4 to about 6 carbon atoms, such as methyl, ethyl, propyl, butyl, isobutyl, pentyl, hexyl, cyclohexyl, and the like, and various isomers thereof. Aryl examples contain, for example, from about 6 to about 24 carbon atoms, from about 6 to about 18 carbon atoms, from about 6 to about 12 carbon atoms, such as phenyl, and the like.

Specific POSS carboxylic acid examples include amic acid-cyclohexyl POSS (CA0295), amic acid-isobutyl POSS, amic acid-phenyl POSS, octa amic acid POSS (CA0298), all available from Hybrid Plastics Inc., Hattiesburg, Miss.

Polyimides, which can be selected as the supporting substrate and as the POSS modified polyimide surface layer for the multi layer intermediate transfer members, especially the two or dual layer members, and the POSS modified polyimide layer for the single layer intermediate transfer members, may be synthesized from prepolymer solutions, such as polyamic acid or esters of polyamic acid, or by the reaction of a dianhydride and a diamine. Suitable dianhydrides include aromatic dianhydrides and aromatic tetracarboxylic acid dianhydrides such as, for example, 9,9-bis(trifluoromethyl) xanthene-2,3,6,7-tetracarboxylic acid dianhydride, 2,2-bis-(3,4-dicarboxyphenyl)-hexafluoropropane dianhydride, 2,2-bis((3,4-dicarboxyphenoxy)phenyl)-hexafluoropropane dianhydride, 4,4'-bis(3,4-dicarboxy-2,5,6-trifluorophenoxy) octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)-ether dianhydride, di-(4-(3,4-dicarboxyphenoxy)phenyl)-sulfide dianhydride, di-(3,4-dicarboxyphenyl)methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis (2,3-dicarboxyphenyl)methane dianhydride, bis(3,4-dicarboxyphenyl)methane dianhydride, 4,4'-(p-phenylenedioxy) diphthalic dianhydride, 4,4'-(m-phenylenedioxy)diphthalic dianhydride, 4,4'-diphenylsulfidedioxybis(4-phthalic acid) dianhydride, 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis(4-phenyleneoxy-4-phthalic acid)dianhydride, hexafluoroisopropylidenebis(4-phenyleneoxy-4-phthalic acid)dianhydride, and the like. Exemplary diamines suitable for use in the preparation of the polyimide include aromatic diamines such as 4,4'-bis(m-aminophenoxy)-biphenyl, 4,4'-bis(m-aminophenoxy)-diphenyl sulfide, 4,4'-bis(m-aminophenoxy)-diphenyl sulfone, 4,4'-bis(p-aminophenoxy)-benzophenone, 4,4'-bis(p-aminophenoxy)-diphenyl sulfide, 4,4'-bis(p-aminophenoxy)-diphenyl sulfone, 4,4'-diamino-azobenzene, 4,4'-diaminobiphenyl, 4,4'-diaminodiphenyl sulfone, 4,4'-diamino-p-terphenyl, 1,3,-bis(gamma-aminopropyl)-tetramethyl-disiloxane, 1,6-diaminohexane, 4,4'-diaminodiphenylmethane, 3,3'-diaminodiphenyl methane, 1,3,-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluorobiphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]sulfone, bis[4-(3-aminophenoxy)phenyl] ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane.

The dianhydrides and diamines are, for examples, selected in a weight ratio of dianhydride to diamine of from about 20:80 to about 80:20, and more specifically, about 50:50 weight ratio. The above aromatic dianhydride, and more specifically, aromatic tetracarboxylic acid dianhydride, and diamine, and more specifically, aromatic diamine, are used singly or as a mixture, respectively. The polyimide can be prepared from the dianhydride and diamine by known methods. For example, the dianhydride and the diamine can be suspended or dissolved in an organic solvent as a mixture or separately, and can be reacted to form the polyamic acid.

Examples of the polyamic acid solutions (polyimide precursor) that can be used to react with the POSS component to form the POSS modified polyimide include low temperature and rapidly cured polyamic acid solutions, such as VTEC™ PI 1388, 080-051, 851, 302, 203, 201, and PETI-5, all available from Richard Blaine International, Incorporated, Reading, Pa. These polyamic acid solutions can be cured at temperatures of from about 180° C. to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Other polyamic acid solutions that can be selected for the POSS modified polyimide, and cured at temperatures of above 300° C. include PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I., and a polyamic acid ester.

Specific polyamic acid solutions selected, in embodiments, include such as those formed by reacting pyromellitic acid and diaminodiphenylether, or by imidization of copolymeric acids such as biphenyltetracarboxylic acid and pyromellitic acid with two aromatic diamines such as p-phenylenediamine and diaminodiphenylether; pyromellitic dianhydride and benzophenone tetracarboxylic dianhydride copolymeric acids reacted with 2,2-bis[4-(8-aminophenoxy)phenoxy]-hexafluoropropane, and polyamic acid solutions include containing 1,2,1',2'-biphenyltetracarboximide and para-phenylene groups, and those having biphenyltetracarboximide functionality with diphenylether end spacer characterizations. Mixtures of polyamic acid solutions can also be used.

The POSS component is present, for example, in an amount of from about 1 to about 40 weight percent, from about 2 to about 30 weight percent, or from about 5 to about 20 weight percent of the POSS modified polyimide; and the polyimide component is present in an amount of from about 60 to about 99 weight percent, from about 70 to about 98 weight percent, or from about 80 to about 95 weight percent of the POSS modified polyimide.

Examples of additional components present in the intermediate transfer member layers are a number of known polymers or binders, and conductive components.

Examples of polymeric binders that, in embodiments, may be included in the POSS modified polyimide layer illustrated herein are polyimide (thermosetting or thermoplastic), polyamideimides, polycarbonates, polyesters such as poly(ethylene terephthalate) (PET), poly(ethylene naphthalate) (PEN) and poly(butylene terephthalate) (PBT), polypolyvinylidene fluoride (PVDF), polyethylene-co-polytetrafluoroethylene, polyphenylene sulfide, polyamide, polysulfone, polyetherimide, and more specifically, polyimide and polyamideimide at temperatures of above 300° C. include PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN and FN, all commercially available from E.I. DuPont, Wilmington, Del.

Examples of known polyimides selected for the intermediate transfer members illustrated herein may be prepared as fully imidized polymers which usually do not contain any "amic" acid, and do not require a high temperature cure to convert them to the imide form. A typical polyimide of this type may be prepared by reacting di-(2,3-dicarboxyphenyl) ether dianhydride with 5-amino-1-(p-aminophenyl)-1,3,3-trimethylindane. This polymer is available as Polyimide XU 218, available from Ciba-Geigy Corporation, Ardsley, N.Y. Other fully imidized polyimides are available from Lenzing Corporation, USA in Dallas, Tex., and are sold as Lenzing P83 polyimide, and by Mitsui Toatsu Chemicals, New York, N.Y. available as Larc-TPI.

In embodiments, examples of thermoplastic polyimides that can be selected for the intermediate transfer member are KAPTON® KJ, commercially available from E.I. DuPont, Wilmington, Del., as represented by

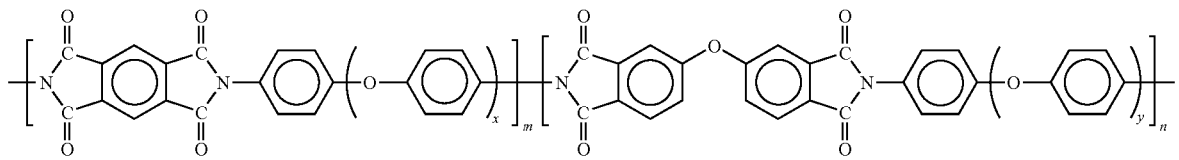

present in an amount of from about 1 to about 90 weight percent, or from about 30 to about 70 weight percent of the total intermediate transfer member.

wherein x is equal to 2; y is equal to 2; m and n are from about 10 to about 300; and IMIDEX®, commercially available from West Lake Plastic Company, as represented by

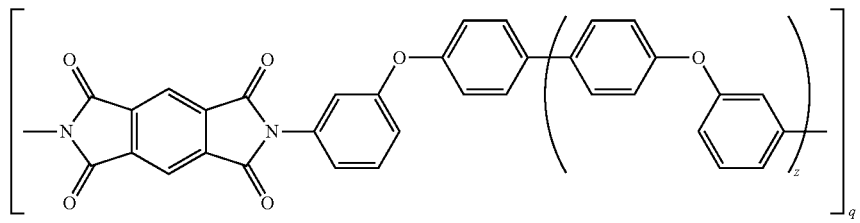

Examples of thermosetting polyimides that can be incorporated into the silsesquioxane modified polyimide of the intermediate transfer member include known low temperature and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180° C. to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Other thermosetting polyimides that can be selected for the ITM or ITB, and cured wherein z is equal to 1, and q is from about 10 to about 300, from about 75 to 150, or from about 100 to about 200.

Examples of polyamideimides that can be incorporated into the silsesquioxane modified polyimide intermediate transfer members are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10

($T_g$=272° C.), commercially available from Solvay Advanced Polymers, LLC, Alpharetta, Ga.

The conductive material, such as a carbon black, a metal oxide or a polyaniline, is present in at least one layer of the intermediate transfer member in, for example, an amount of from about 1 to about 30 weight percent, from about 3 to about 20 weight percent, or specifically from about 5 to about 15 weight percent of the intermediate transfer member layer.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is dependent on surface area and its structure primarily. Generally, the higher the surface area and the higher the structure, the more conductive the carbon black. Surface area can be measured by the B.E.T. nitrogen surface area per unit weight of carbon black, and is the measurement of the primary particle size. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the silsesquioxane modified polyimide members disclosed herein include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 $m^2$/g, DBP absorption=1.05 ml/g), BLACK PEARLS® 880 (B.E.T. surface area=240 $m^2$/g, DBP absorption=1.06 ml/g), BLACK PEARLS® 800 (B.E.T. surface area=230 $m^2$/g, DBP absorption=0.68 ml/g), BLACK PEARLS® L (B.E.T. surface area=138 $m^2$/g, DBP absorption=0.61 ml/g), BLACK PEARLS® 570 (B.E.T. surface area=110 $m^2$/g, DBP absorption=1.14 ml/g), BLACK PEARLS® 170 (B.E.T. surface area=35 $m^2$/g, DBP absorption=1.22 ml/g), VULCAN® XC72 (B.E.T. surface area=254 $m^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 $m^2$/g, DBP absorption=0.59 ml/g), REGAL® 400 (B.E.T. surface area=96 $m^2$/g, DBP absorption=0.69 ml/g), REGAL® 330 (B.E.T. surface area=94 $m^2$/g, DBP absorption=0.71 ml/g), MONARCH® 880 (B.E.T. surface area=220 $m^2$/g, DBP absorption=1.05 ml/g, primary particle diameter=16 nanometers), and MONARCH® 1000 (B.E.T. surface area=343 $m^2$/g, DBP absorption=1.05 ml/g, primary particle diameter=16 nanometers).

Further examples of carbon blacks selected as the conductive component include Channel carbon blacks available from Evonik-Degussa. Specific examples of Channel conductive carbon blacks are Special Black 4 (B.E.T. surface area=180 $m^2$/g, DBP absorption=1.8 ml/g, primary particle diameter=25 nanometers), Special Black 5 (B.E.T. surface area=240 $m^2$/g, DBP absorption=1.41 ml/g, primary particle diameter=20 nanometers), Color Black FW1 (B.E.T. surface area=320 $m^2$/g, DBP absorption=2.89 ml/g, primary particle diameter=13 nanometers), Color Black FW2 (B.E.T. surface area=460 $m^2$/g, DBP absorption=4.82 ml/g, primary particle diameter=13 nanometers), and Color Black FW200 (B.E.T. surface area=460 $m^2$/g, DBP absorption=4.6 ml/g, primary particle diameter=13 nanometers).

The carbon black is usually formed into a dispersion, such as a carbon black blend of the POSS component and the polyamic acid solution, or a carbon black blend of the POSS component, the polyamic acid solution, and the polyamide-imide. With proper milling processes, uniform dispersions can be obtained, and then coated on glass plates or polyimide supporting substrates using a draw bar coating method. The resulting individual films can be dried at high temperatures, such as from about 100° C. to about 400° C., for a suitable period of time, such as from about 20 to about 180 minutes, while remaining on the supporting substrates. The POSS modified polyimide forms in situ during the thermal curing process. After drying and cooling to room temperature, about 23° C. to about 25° C., the films on the glass plates can be immersed into water overnight, about 18 to 23 hours, and subsequently, the 50 to 150 micron thick films can be released from the glass to form a functional intermediate transfer member.

In embodiments, the polyaniline component has a relatively small particle size of from about 0.5 to about 5 microns, from about 1.1 to about 2.3 microns, from about 1.2 to about 2 microns, from about 1.5 to about 1.9 microns, or about 1.7 microns. Specific examples of polyanilines selected for the transfer member, such as an intermediate transfer belt, are PANIPOL™ F, commercially available from Panipol Oy, Finland.

Adhesive layer components selected for the plural layered members, and which adhesive layer is usually situated between the supporting substrate and the top POSS containing layer illustrated herein are, for example, a number of resins or polymers of epoxy, urethane, silicone, polyester, and the like. Generally, the adhesive layer is a solventless layer that is materials that are liquid at room temperature (about 25° C.), and are able to crosslink to an elastic or rigid film to adhere at least two materials together. Specific adhesive examples include 100 percent solids adhesives including polyurethane adhesives obtained from Lord Corporation, Erie, Pa., such as TYCEL® 7924 (viscosity from about 1,400 to about 2,000 cps), TYCEL® 7975 (viscosity from about 1,200 to about 1,600 cps), and TYCEL® 7276. The viscosity range of the adhesives is, for example, from about 1,200 to about 2,000 cps. The solventless adhesives can be activated with either heat, room temperature curing, moisture curing, ultraviolet radiation, infrared radiation, electron beam curing, or any other known technique. The thickness of the adhesive layer is usually less than about 100, and more specifically, from about 1 to about 75 nanometers, or other thicknesses as illustrated hereinafter.

The thickness of each layer of the intermediate transfer member can vary and is not usually limited to any specific value. In specific embodiments, the substrate layer thickness is, for example, from about 20 to about 300 microns, from about 30 to about 200 microns, from about 75 to about 150 microns, and from about 50 to about 100 microns, while the thickness of the top POSS modified polyimide layer is, for example, from about 1 to about 150 microns, from about 10 to about 100 microns, from about 20 to about 70 microns, and from about 30 to about 50 microns. The adhesive layer thickness is, for example, from about 1 to about 100 nanometers, from about 5 to about 75 nanometers, or from about 50 to about 100 nanometers.

The surface resistivity of the intermediate transfer members disclosed herein is, for example, from about $10^8$ to about $10^{13}$ ohm/sq, or from about $10^{10}$ to about $10^{12}$ ohm/sq. The sheet resistivity of the intermediate transfer members is, for example, from about $10^8$ to about $10^{13}$ ohm/sq, or from about $10^{10}$ to about $10^{12}$ ohm/sq.

The intermediate transfer members illustrated herein, like intermediate transfer belts, can be selected for a number of printing and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The layer or layers may be deposited on a substrate via well known coating processes like dipping, spraying, such as by multiple spray applications of very thin films, casting, flow-coating, web-coating, roll-coating, extrusion, molding, or the like.

The intermediate transfer member can be of any suitable configuration. Examples of suitable configurations include a sheet, a film, a web, a foil, a strip, a coil, a cylinder, a drum, an endless strip, a circular disc, a belt including an endless belt, and an endless seamed flexible belt. The circumference of the belt configuration for 1 to 2, or more layers is, for example, from about 250 to about 2,500 millimeters, from about 1,500 to about 2,500 millimeters, or from about 2,000 to about 2,200 millimeters. The width of the film or belt is, for example, from about 100 to about 1,000 millimeters, from about 200 to about 500 millimeters, or from about 300 to about 400 millimeters.

The intermediate transfer member can be comprised of a single layer or several layers, such as from about 2 to about 5 layers. In embodiments, the intermediate transfer member further includes an outer release layer.

Release layer examples present as an overcoating for the single layer transfer member and in the multi layer transfer member, include materials, such as TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials such as fluorosilicones and silicone rubbers such as Silicone Rubber 552, available from Sampson Coatings, Richmond, Va., polydimethyl siloxane/dibutyl tin diacetate, 0.45 gram DBTDA per 100 grams of polydimethyl siloxane rubber mixture with molecular weight of approximately 3,500; and fluoroelastomers such as those sold under the trade name VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a trademark of E.I. DuPont de Nemours, Inc. Two known fluoroelastomers are comprised of (1) a class of copolymers of vinylidenefluoride, and hexafluoropropylene, known commercially as VITON A®, (2) a class of terpolymers of vinylidenefluoride, hexafluoropropylene, and tetrafluoroethylene, known commercially as VITON B®, and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomer can be those available from E.I. DuPont, such as 4-bromoperfluorobutene-1, 1,1-dihydro-4-bromoperfluorobutene-1, 3-bromoperfluoropropene-1, 1,1-dihydro-3-bromoperfluoropropene-1, or any other suitable known commercially available cure site monomer.

Specific embodiments will now be described in detail. These examples are intended to be illustrative, and the disclosure is not limited to the materials, conditions, or process parameters set forth in these embodiments. All parts are percentages by weight of total solids unless otherwise indicated.

COMPARATIVE EXAMPLE 1

Preparation of a Polyimide Layer

Twenty grams of a polyamic acid solution (RP50, 7 weight percent in N-methylpyrrolidone, available from UNITECH, LLC, Hampton, Va.) were mixed with 8 grams of N-methylpyrrolidone, and the resulting solution was coated on a glass plate using a draw bar coating method. Subsequently, the film obtained was dried at 100° C. for 20 minutes, and then 260° C. for an additional 120 minutes while remaining on the glass plate.

The above formed film on the glass plate was then immersed into water overnight, about 23 hours, and the free-standing film was released from the glass automatically resulting in a 50 micron thick polyimide layer.

EXAMPLE I

Preparation of a POSS Modified Polyimide Layer

Twenty grams of the polyamic acid solution (RP50, 7 weight percent in N-methylpyrrolidone, available from UNITECH, LLC, Hampton, Va.) were mixed with 0.074 gram of the POSS alcohol (1,2-propanediolisobutyl POSS, available from Hybrid Plastics Inc.), and 9.4 grams of N-methylpyrrolidone, and the resulting solution was coated on a glass plate using a draw bar coating method. Subsequently, the film obtained was dried at 100° C. for 20 minutes, and then 260° C. for an additional 120 minutes while remaining on the glass plate. The POSS modified polyimide (POSS alcohol chemically bonded to polyimide) formed during the heating or curing.

The film on the glass was then immersed into water overnight, about 23 hours, and a freestanding film was released from the glass automatically resulting in a 50 micron thick POSS modified polyimide layer comprising 5 weight percent of the above POSS component, and 95 weight percent of the polyimide component.

EXAMPLE II

Preparation of a POSS Modified Polyimide Layer

Twenty grams of a polyamic acid solution (RP50, 7 weight percent in N-methylpyrrolidone, available from UNITECH, LLC, Hampton, Va.) were mixed with 0.15 gram of a POSS alcohol (1,2-propanediolisobutyl POSS, available from Hybrid Plastics Inc.), and 10.85 grams of N-methylpyrrolidone, and the resulting solution was coated on a glass plate using a draw bar coating method. Subsequently, the film obtained was dried at 100° C. for 20 minutes, and then 260° C. for an additional 120 minutes while remaining on the glass plate. The POSS modified polyimide (POSS alcohol chemically bonded to polyimide) formed during the above heating.

The above film on the glass was then immersed into water overnight, about 23 hours, and the freestanding film was released from the glass automatically resulting in a 50 micron thick POSS modified polyimide layer comprising 10 weight percent of the POSS component, and 90 weight percent of the polyimide component.

EXAMPLE III

Preparation of a Single Layer POSS Modified Polyimide Intermediate Transfer Member One gram of Color Black FW1 (B.E.T. surface area=320 $m^2/g$, DBP absorption=2.89 ml/g, primary particle diameter=13 nanometers), as obtained from Evonik-Degussa, was mixed with 94.2 grams of the polyamic acid solution (RP50, 7 weight percent in N-methylpyrrolidone, available from UNITECH, LLC, Hampton, Va.), 0.73 gram of the POSS alcohol (1,2-propanediolisobutyl POSS, available from Hybrid Plastics Inc.), and 70.67 grams of N-methylpyrrolidone. By ball milling the resulting mixture with 2 millimeter stainless shot with an Attritor for 1 hour, a uniform dispersion was obtained. The resulting dispersion was then coated on a glass plate using a draw bar coating method. Subsequently, the film obtained was dried at 100° C. for 20 minutes, and then at 260° C. for an additional 120 minutes while remaining on the glass plate. The POSS modified polyimide (POSS alcohol chemically bonded to polyimide) formed during the aforementioned heating.

The film on the glass was then immersed into water overnight, about 23 hours, and a freestanding film was released from the glass automatically resulting in an intermediate transfer member with a 50 micron thick carbon black/POSS modified polyimide layer with a ratio by weight percent of 12 carbon black, and 88 POSS modified polyimide (10 weight percent of the POSS component, and 90 weight percent of the polyimide component).

EXAMPLE IV

Preparation of a Single Layer POSS Modified Polyimide Intermediate Transfer Member One gram of Color Black FW1 (B.E.T. surface area=320 $m^2/g$, DBP absorption=2.89 ml/g, primary particle diameter=13 nanometers), as obtained from Evonik-Degussa, was mixed with 67.5 grams of the polyamic acid solution (RP50, 7 weight percent in N-methylpyrrolidone, available from UNITECH, LLC, Hampton, Va.), 0.53 gram of the POSS alcohol (1,2-propanediolisobutyl POSS, available from Hybrid Plastics Inc.), and 55.97 grams of N-methylpyrrolidone. By ball milling the resulting mixture with 2 millimeter stainless shot with an Attritor for 1 hour, a uniform dispersion was obtained. The resulting dispersion was then coated on a glass plate using a draw bar coating method. Subsequently, the film obtained was dried at 100° C. for 20 minutes, and then 260° C. for an additional 120 minutes while remaining on the glass plate. The POSS modified polyimide (POSS alcohol chemically bonded to polyimide) formed during the thermal curing process.

The film on the glass was then immersed into water overnight, about 23 hours, and the freestanding film was released from the glass automatically resulting in an intermediate transfer member with a 50 micron thick carbon black/POSS modified polyimide layer with a ratio by weight percent of 16 carbon black, and 84 POSS modified polyimide (10 weight percent of the POSS component, and 90 weight percent of the polyimide component).

EXAMPLE V

Preparation of a Dual Layer Intermediate Transfer Member Comprising a Polyimide Bottom Layer and a POSS Modified Polyimide Surface Layer A polyimide bottom or first supporting substrate layer was prepared as follows. One gram of Color Black FW1 (B.E.T. surface area=320 $m^2/g$, DBP absorption=2.89 ml/g, primary particle diameter=13 nanometers), as obtained from Evonik-Degussa, was mixed with 87.7 grams of the polyamic acid solution (RP50, 7 weight percent in N-methylpyrrolidone, available from UNITECH, LLC, Hampton, Va.), and 54.1 grams of N-methylpyrrolidone. By ball milling the obtained mixture with 2 millimeter stainless shot with an Attritor for 1 hour, a uniform dispersion was obtained. The resulting dispersion was then coated on a glass plate using a draw bar coating method. Subsequently, the film obtained was dried at 100° C. for 20 minutes, and then 260° C. for an additional 120 minutes while remaining on the glass plate.

A POSS modified polyimide surface layer was prepared as follows. One gram of Color Black FW1 (B.E.T. surface area=320 $m^2/g$, DBP absorption=2.89 ml/g, primary particle diameter=13 nanometers), as obtained from Evonik-Degussa, was mixed with 78.9 grams of the polyamic acid solution (RP50, 7 weight percent in N-methylpyrrolidone, available from UNITECH, LLC, Hampton, Va.), 0.61 gram of a POSS alcohol (1,2-propanediolisobutyl POSS, available from Hybrid Plastics Inc.), and 62.29 grams of N-methylpyrrolidone. By ball milling this mixture with 2 millimeter stainless shot with an Attritor for 1 hour, a uniform dispersion was obtained. The resulting dispersion was then coated on the above polyimide bottom or first supporting substrate layer present on the glass plate using a draw bar coating method. Subsequently, the resulting dual layer film obtained was dried at 100° C. for 20 minutes, and then 260° C. for an additional 120 minutes while remaining on the glass plate.

The dual layer film on the glass was then immersed into water overnight, about 23 hours, and a freestanding film was released from the glass automatically resulting in a dual layer intermediate transfer member with a 75 micron thick carbon black/polyimide base layer with a ratio by weight percent of 14 carbon black and 86 polyimide, and a 20 micron thick carbon black/POSS modified polyimide surface layer with a ratio by weight percent of 14 carbon black, and 86 POSS modified polyimide (10 weight percent of the POSS component, and 90 weight percent of the polyimide component).

EXAMPLE VI

A number of single layer intermediate transfer belt (ITB) members are prepared by repeating the process of Example IV except in the place of the POSS alcohol there is selected the POSS epoxide glycidylisobutyl POSS, or glycidylphenyl POSS; the POSS amine aminoethylaminopropylisobutyl POSS; the POSS carboxylic acid POSS amic acid-cyclohexyl, or POSS octa amic acid, all obtained from Hybrid Plastics Inc.

EXAMPLE VII

A number of dual or two layer intermediate transfer belt (ITB) members are prepared by repeating the process of Example V except that in the place of the POSS alcohol there is selected the POSS epoxide glycidylisobutyl POSS, or glycidylphenyl POSS; the POSS amine aminoethylaminopropylisobutyl POSS; the POSS carboxylic acid POSS amic acid-cyclohexyl, or POSS octa amic acid, all obtained from Hybrid Plastics Inc.

Surface Resistivity Measurement

The above ITB members or devices of Examples III, IV and V were measured for surface resistivity (averaging four to six measurements at varying spots, 72° F./65 percent room humidity) using a High Resistivity Meter (Hiresta-Up MCP-HT450 from Mitsubishi Chemical Corp.). The results are provided in Table 1.

TABLE 1

| | Surface Resistivity (ohm/sq) |
|---|---|
| Example III, Carbon Black/POSS Modified Polyimide = 12/88 Single Layer ITB | $5.87 \times 10^{13}$ |
| Example IV, Carbon Black/POSS Modified Polyimide = 16/84 Single Layer ITB | $3.15 \times 10^{9}$ |
| Example V, Carbon Black/POSS Modified Polyimide = 14/86 Surface Layer ITB | $6.07 \times 10^{11}$ |

Functional ITB members are obtained for both the POSS modified polyimide single layer ITB (Examples III and IV), and the POSS modified polyimide surface layer ITB (dual layer, Example V).

Contact Angle Measurements

The contact angles of water (in deionized water) of the polymeric layers of Comparative Example 1, and Examples I and II were measured at ambient temperature (about 23° C.), using the Contact Angle System OCA (Dataphysics Instruments GmbH, model OCA15). At least ten measurements were performed, and their averages are reported in Table 2.

TABLE 2

| | Water Contact Angle |
|---|---|
| Comparative Example 1, Polyimide | 82° |
| Example I, 5 Weight Percent POSS Modified Polyimide | 100° |
| Example II, 10 Weight Percent POSS Modified Polyimide | 111° |

The POSS modified polyimides possess higher contact angles than the polyimide itself. With 5 weight percent of the POSS component incorporated into the polyimide component (Example I), the contact angle increased 18°. With 10 weight percent of the POSS component incorporated into the polyimide component (Example II), the contact angle increased by 29°. The ITB members comprising these POSS modified polyimides are believed to have excellent transfer efficiency, for example about 100 percent in embodiments, and dimensional stability primarily because of the water compelling characteristics of the POSS modified polyimide.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprised of a polyhedral silsesquioxane polyimide, wherein said silsesquioxane is attached to said polyimide, and wherein said polyhedral silsesquioxane polyimide is formed by reacting a POSS component selected from the group consisting of a POSS amine, a POSS alcohol, a POSS carboxylic acid, and a POSS epoxide with a polyamic acid, and wherein POSS is a polyhedral oligomeric silsesquioxane, wherein said POSS alcohol is represented by at least one of

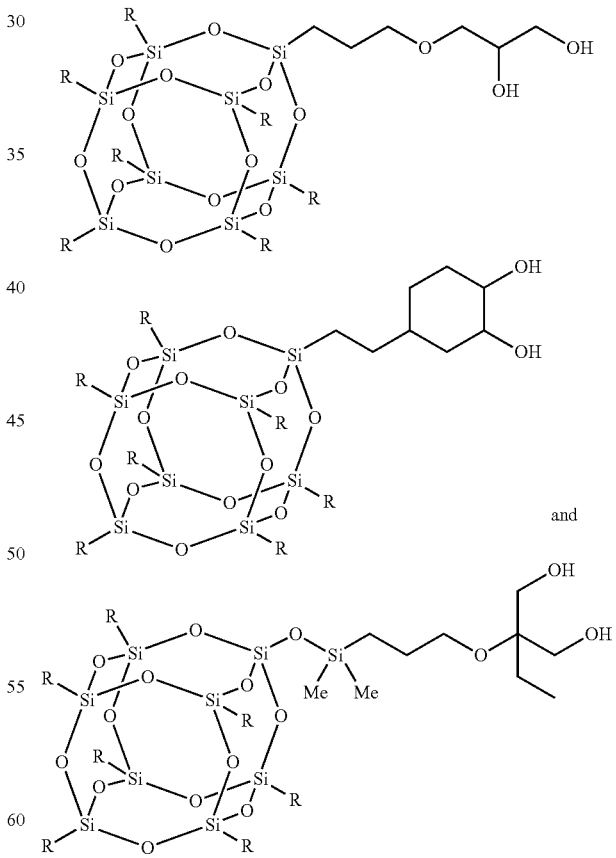

and where each R substituent is alkyl with from about 1 to 12 carbon atoms, aryl with from about 6 to about 24 carbon atoms, or mixtures thereof; wherein said POSS epoxide is represented by at least one of

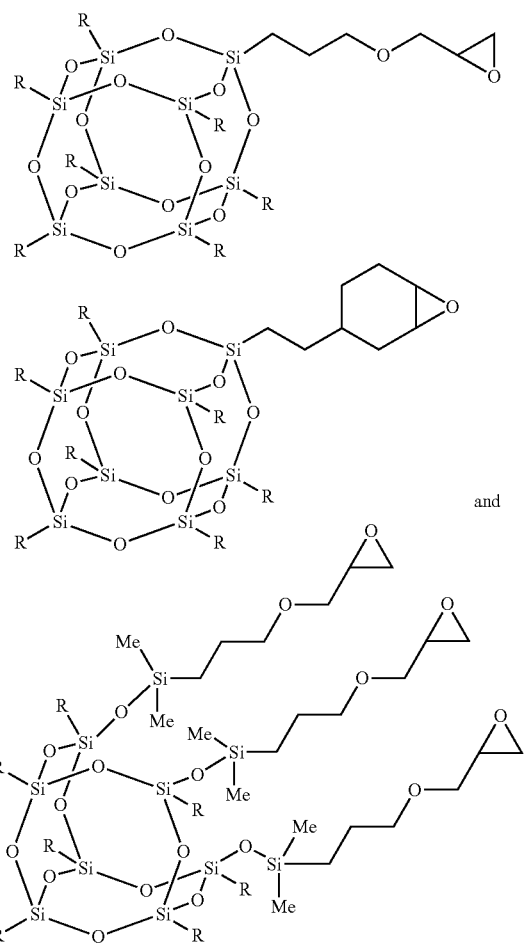

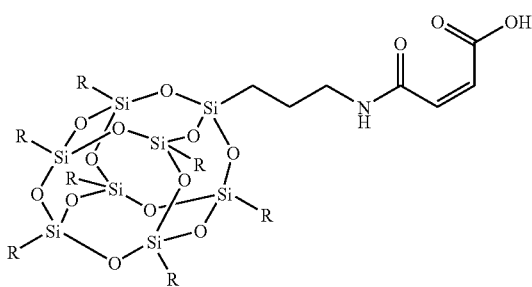

where each R substituent is alkyl with from about 1 to 12 carbon atoms, aryl with from about 6 to about 24 carbon atoms, or mixtures thereof; wherein said POSS carboxylic is represented by at least one of where each R substituent is alkyl with from about 1 to 12 carbon atoms, aryl with from about 6 to about 24 carbon atoms, or mixtures thereof; and wherein said POSS amine is represented by at least one of

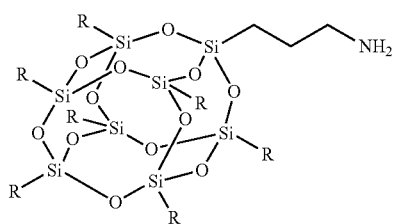

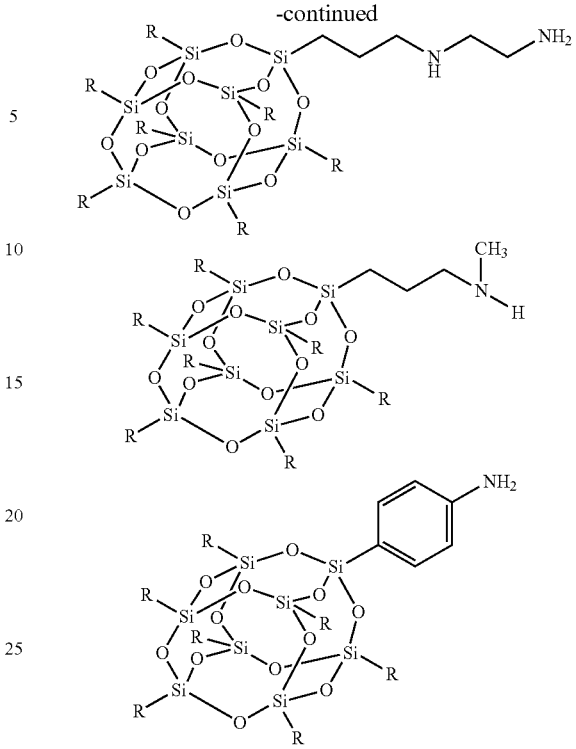

where each R substituent is alkyl with from about 1 to 12 carbon atoms, aryl with from about 6 to about 24 carbon atoms, or mixtures thereof.

2. An intermediate transfer member in accordance with claim 1 wherein said polyhedral silsesquioxane is present in an amount of from about 1 to about 40 weight percent, and said polyimide is present in an amount of from about 99 to about 60 weight percent based on the weight percent of said polyhedral silsesquioxane polyimide, and wherein the total thereof of said polyimide and said polyhederal silsesquioxane is about 100 percent.

3. An intermediate transfer member in accordance with claim 1 wherein said polyhedral silsesquioxane is present in an amount of from about 5 to about 20 weight percent, and said polyimide is present in an amount of from about 95 to about 80 weight percent of said polyhedral silsesquioxane polyimide.

4. An intermediate transfer member in accordance with claim 1 wherein said POSS alcohol is one of 2-ethyl-2-[3-[[(heptaisobutylpentacyclo-[9.5.1.1$^{3,9}$.1$^{5,15}$.1$^{7,13}$]octasiloxanyl)oxy]dimethylsilyl]-propoxymethyl]-1,3-propanediol diolisobutyl POSS, trans-cyclohexanediolisobutyl POSS, 1,2-propanediolisobutyl POSS, or octa(3-hydroxy-3-methylbutyldimethylsiloxy) POSS; said POSS epoxide is one of epoxycyclohexylisobutyl POSS, glycidylethyl POSS, glycidylisobutyl POSS, glycidylisooctyl POSS, triglycidylcyclohexyl POSS, triglycidylisobutyl POSS, glycidylphenyl POSS, octaepoxycyclohexyldimethylsilyl POSS, or octaglycidyldimethylsilyl POSS; said POSS amine is one of aminopropylisobutyl POSS, aminopropylisooctyl POSS, aminopropylphenyl POSS, aminoethylaminopropylisobutyl POSS, octaaminophenyl POSS, N-phenylaminopropyl POSS, N-methylaminopropylisobutyl POSS, octaammonium POSS, p-aminophenylcyclohexyl POSS, m-aminophenylcyclohexyl POSS, p-aminophenylisobutyl POSS, or m-aminophenylisobutyl POSS; and said POSS carboxylic acid is one of amic acid-cyclohexyl POSS, amic acid-isobutyl POSS, amic acid-phenyl POSS, or octa amic acid POSS.

5. An intermediate transfer member in accordance with claim 1 wherein said polyamic acid is mixed with a solvent.

6. An intermediate transfer member in accordance with claim 1 wherein said polyhedral silsesquioxane polyimide is at least one of a POSS polyimide, a POSS polyetherimide, a POSS polyamideimide, or mixtures thereof.

7. An intermediate transfer member in accordance with claim 1 further including a supporting substrate in contact with said polyhedral silsesquioxane polyimide.

8. An intermediate transfer member in accordance with claim 7 wherein said supporting substrate is at least one of a polyimide, a polyetherimide, a polyamideimide, or mixtures thereof.

9. An intermediate transfer member in accordance with claim 7 further including in said polyhedral silsesquioxane polyimide a conductive component of at least one of a carbon black, a metal oxide, a polyaniline, and mixtures thereof, each present in an amount of from about 1 to about 50 percent by weight based on the weight of total solids.

10. An intermediate transfer member in accordance with claim 7 further including in said supporting substrate and in said polyhedral silsesquioxane polyimide a conductive component of at least one of a carbon black, a metal oxide, a polyaniline, and mixtures thereof, each present in an amount of from about 1 to about 50 percent by weight based on the weight of total solids.

11. An intermediate transfer member in accordance with claim 7 wherein said member has a surface resistivity of from about $10^9$ to about $10^{12}$ ohm/sq, and a circumference of from about 250 to about 2,500 millimeters.

12. A transfer media comprised of a polyhedral silsesquioxane polyimide, wherein said silsesquioxane is chemically bonded to said polyimide, generated by the reaction of said polyhedral silsesquioxane and a component as represented by

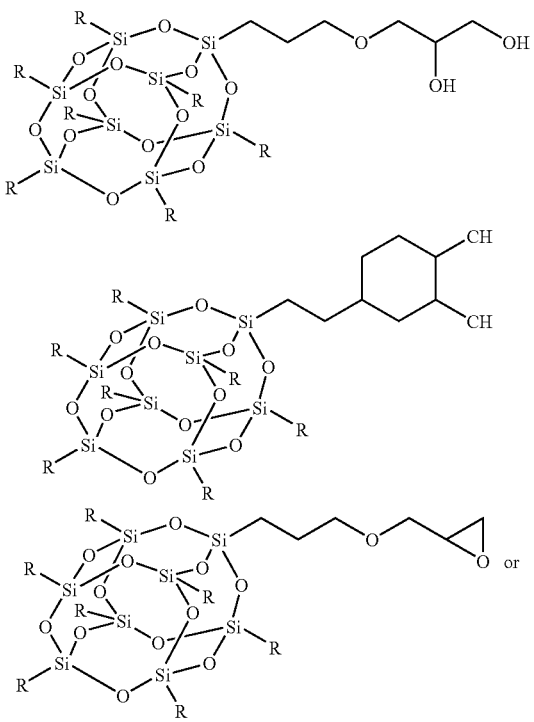

-continued wherein each R is alkyl, aryl, or mixtures thereof.

13. A transfer media in accordance with claim 12 wherein alkyl contains from 1 to about 12 carbon atoms, and aryl contains from 6 to about 18 carbon atoms.

14. A transfer media in accordance with claim 12 wherein each R is one of methyl, ethyl, propyl, butyl, pentyl, hexyl, cyclohexyl, heptyl, octyl, or phenyl.

15. A transfer media in accordance with claim 12 further including in said media a polymer selected from the group consisting of a polyimide, a polycarbonate, a polyester, a polyvinylidene fluoride, a polysulfone, a polyetherimide, a polyamideimide, a polyamide, a polyethylene-co-polytetrafluoroethylene, and mixtures thereof.

16. A transfer media in accordance with claim 12 further including as an overcoating in contact with said polyhedral silsesquioxane polyimide a layer of a fluorinated ethylene propylene copolymer, a polytetrafluoroethylene, a polyfluoroalkoxy polytetrafluoroethylene, a fluorosilicone, a polymer of a vinylidenefluoride, hexafluoropropylene, and tetrafluoroethylene, or mixtures thereof.

17. A transfer media in accordance with claim 12 further including therein a carbon black, a metal oxide, a polyaniline, or mixtures thereof.

18. A transfer media in accordance with claim 12 wherein said component is a POSS alcohol of trans-cyclohexanediolisobutyl POSS, 1,2-propanediolisobutyl POSS, or octa(3-hydroxy-3-methylbutyldimethylsiloxy) POSS; a POSS epoxide of epoxycyclohexylisobutyl POSS, glycidylethyl POSS, glycidylisobutyl POSS, glycidylisooctyl POSS, triglycidylcyclohexyl POSS, triglycidylisobutyl POSS, glycidylphenyl POSS, octaepoxycyclohexyldimethylsilyl POSS, or octaglycidyldimethylsilyl POSS; a POSS amine of aminopropylisobutyl POSS, aminopropylisooctyl POSS, aminopropylphenyl POSS, aminoethylaminopropylisobutyl POSS, octaminophenyl POSS, N-phenylaminopropyl POSS, N-methylaminopropylisobutyl POSS, octaammonium POSS, p-aminophenylcyclohexyl POSS, m-aminophenylcyclohexyl POSS, p-aminophenylisobutyl POSS, or m-aminophenylisobutyl POSS; and a POSS carboxylic acid of amic acid-cyclohexyl POSS, amic acid-isobutyl POSS, amic acid-phenyl POSS, or octa amic acid POSS wherein POSS is a polyhedral oligomeric silsesquioxane.

19. A transfer member in accordance with claim 12 wherein said component is represented by -continued

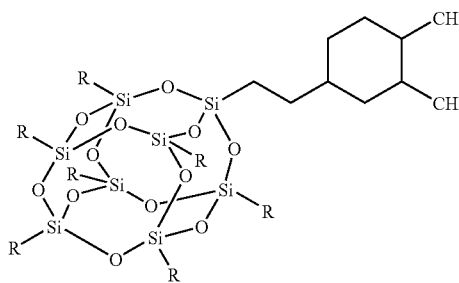

wherein R is alkyl containing from 1 to about 6 carbon atoms.

20. A transfer media in accordance with claim 12 wherein said component is a POSS alcohol represented by

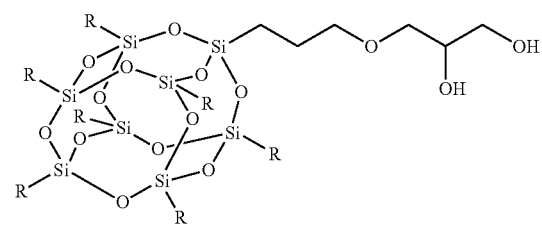

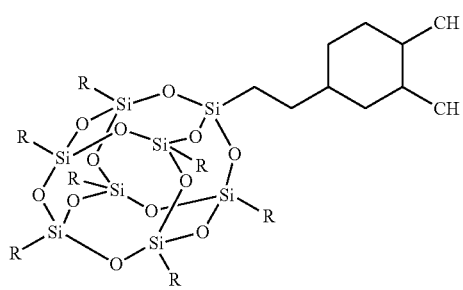

and

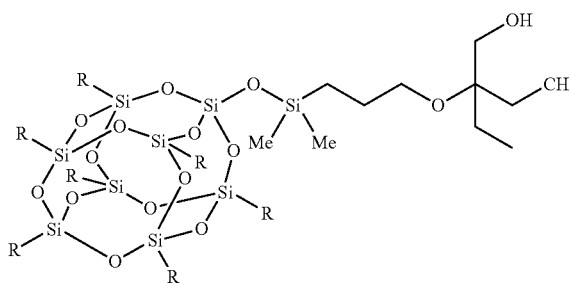

wherein each R substituent is alkyl or aryl; or a POSS epoxide comprised of at least one POSS moiety and at least one epoxide group, which POSS epoxide

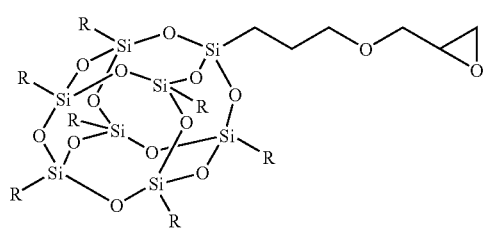

wherein each R substituent is alkyl or aryl

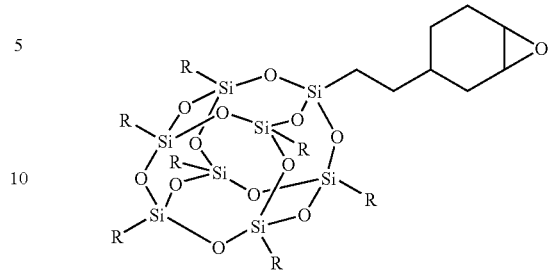

and wherein POSS is a polyhedral oligomeric silsesquioxane.

21. An intermediate transfer media comprised of a supporting substrate, and thereover a polyhedral silsesquioxane polyimide, wherein said silsesquioxane is chemically bonded to said polyimide, generated by the reaction of said polyhedral silsesquioxane and a component represented by

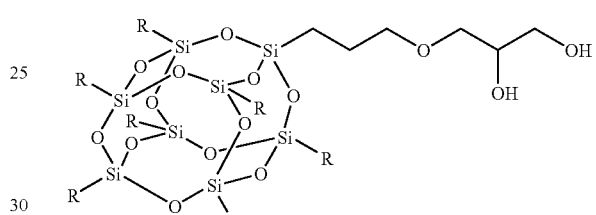

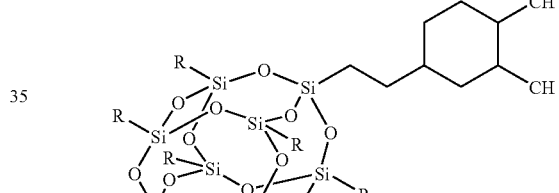

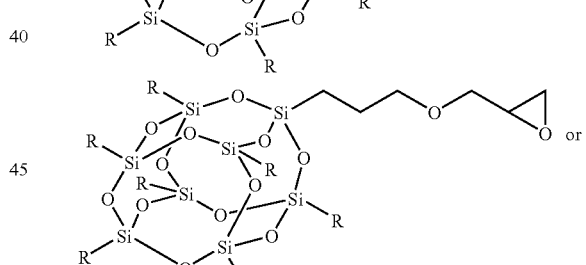

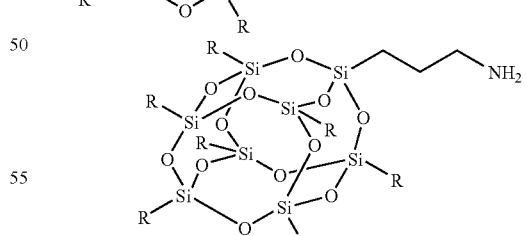

wherein each R is alkyl, aryl, or mixtures thereof.

22. An intermediate transfer media in accordance with claim 21 wherein alkyl contains from 1 to about 12 carbon atoms, and aryl contains from 6 to about 18 carbon atoms, and said substrate is a polyimide.

23. An intermediate transfer media in accordance with claim 21 wherein each R is one of methyl, ethyl, propyl, butyl, pentyl, hexyl, cyclohexyl, heptyl, octyl or phenyl.

24. An intermediate transfer media in accordance with claim 21 further including in said polyhedral silsesquioxane polyimide a polymer selected from the group consisting of a polyimide, a polycarbonate, a polyester, a polyvinylidene fluoride, a polysulfone, a polyetherimide, a polyamideimide, a polyamide, a polyethylene-co-polytetrafluoroethylene, and mixtures thereof.

25. An intermediate transfer member in accordance with claim 21 further including as an overcoating deposited on said polyhedral silsesquioxane polyimide a layer of a fluorinated ethylene propylene copolymer, a polytetrafluoroethylene, a polyfluoroalkoxy polytetrafluoroethylene, a fluorosilicone, a polymer of a vinylidenefluoride, hexafluoropropylene, and tetrafluoroethylene, or mixtures thereof.

26. An intermediate transfer member in accordance with claim 21 further including in said supporting substrate and including in said polyhedral silsesquioxane polyimide a carbon black, a metal oxide, a polyaniline, or mixtures thereof.

27. An intermediate transfer member in accordance with claim 21 wherein said component is a POSS alcohol of trans-cyclohexanediolisobutyl POSS, 1,2-propanediolisobutyl POSS, or octa(3-hydroxy-3-methylbutyldimethylsiloxy) POSS; a POSS epoxide of epoxycyclohexylisobutyl POSS, glycidylethyl POSS, glycidylisobutyl POSS, glycidylisooctyl POSS, triglycidylcyclohexyl POSS, triglycidylisobutyl POSS, glycidylphenyl POSS, octaepoxycyclohexyldimethylsilyl POSS, or octaglycidyldimethylsilyl POSS; a POSS amine of aminopropylisobutyl POSS, aminopropylisooctyl POSS, aminopropylphenyl POSS, aminoethylaminopropylisobutyl POSS, octaminophenyl POSS, N-phenylaminopropyl POSS, N-methylaminopropylisobutyl POSS, octaammonium POSS, p-aminophenylcyclohexyl POSS, m-aminophenylcyclohexyl POSS, p-aminophenylisobutyl POSS, or m-aminophenylisobutyl POSS; and a POSS carboxylic acid of amic acid-cyclohexyl POSS, amic acid-isobutyl POSS, amic acid-phenyl POSS, or octa amic acid POSS, and wherein POSS is a polyhedral oligomeric silsesquioxane.

28. An intermediate transfer member in accordance with claim 21 wherein said component is

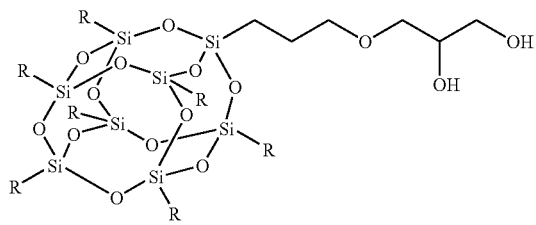

wherein each R is alkyl containing from 1 to about 6 carbon atoms, aryl containing from 6 to about 18 carbon atoms, or mixtures thereof.

29. An intermediate transfer member in accordance with claim 21 wherein said component is

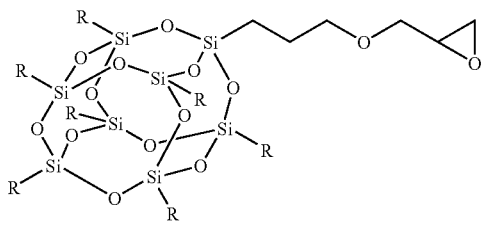

wherein each R is alkyl containing from 1 to about 6 carbon atoms, aryl containing from 6 to about 18 carbon atoms, or mixtures thereof.

30. An intermediate transfer member in accordance with claim 21 wherein said component is

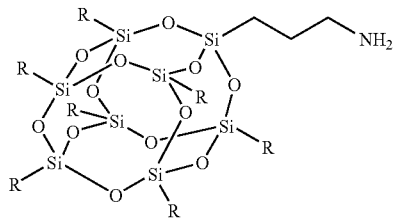

wherein alkyl contains from 1 to about 6 carbon atoms, and aryl contains from 6 to about 12 carbon atoms.

31. An intermediate transfer media in accordance with claim 21 wherein said component is

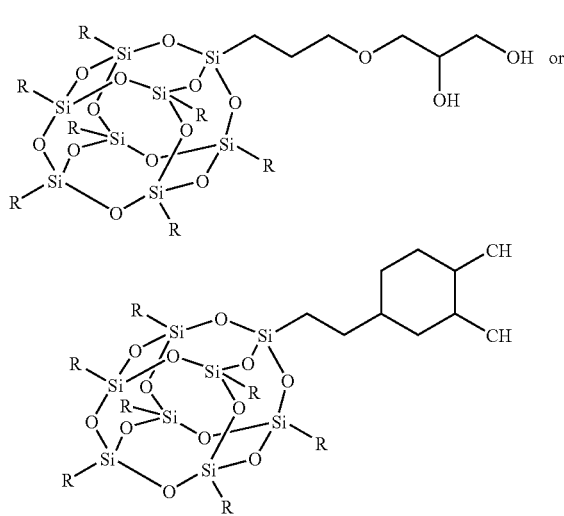

wherein R is alkyl containing from 1 to about 4 carbon atoms, or aryl containing from 6 to about 18 carbon atoms.

32. An intermediate transfer member in accordance with claim 21 wherein said component is a POSS alcohol as represented by

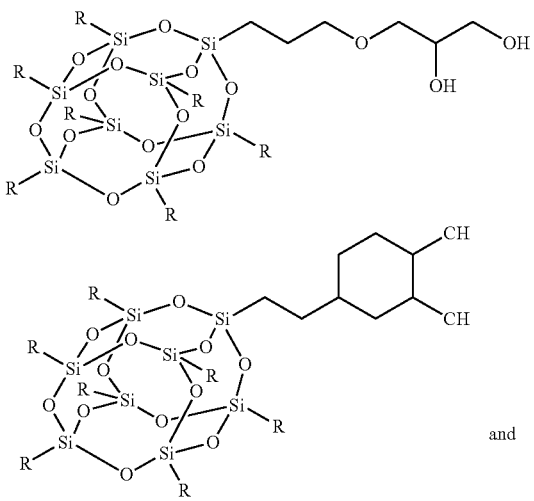

and

-continued

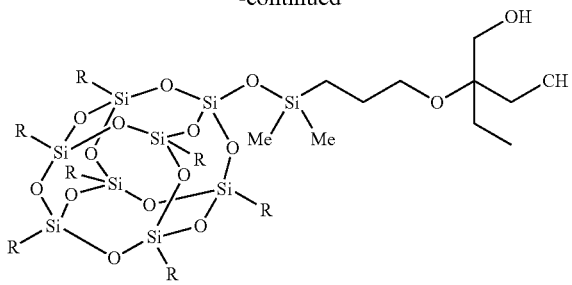

wherein each R substituent is alkyl, aryl, or a POSS epoxide represented by

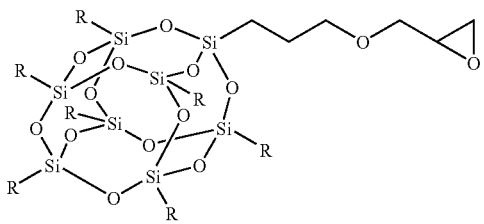

and wherein each R is alkyl or aryl

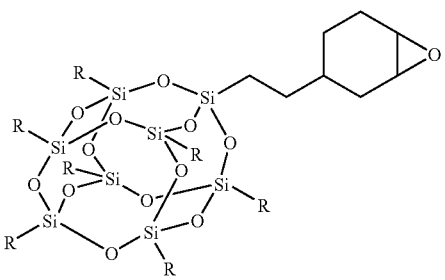

and wherein POSS is a polyhedral silsesquioxane oligomer.

33. An intermediate transfer member in accordance with claim 21 wherein the substrate layer thickness is from about 20 to about 300 microns, from about 30 to about 200 microns, from about 75 to about 150 microns, or from about 50 to about 100 microns, and the thickness of said polyhedral silsesquioxane polyimide is from about 1 to about 150 microns, from about 10 to about 100 microns, from about 20 to about 70 microns, or from about 30 to about 50 microns.

* * * * *